3,412,413
APPARATUS FOR WASHING VEHICLES
Charles W. Huxley, Birmingham, and George A. N. Jennings, Sutton Coldfield, England, assignors to Sparkbrook Developments Limited, Birmingham, England, a British company
Filed July 11, 1966, Ser. No. 564,315
3 Claims. (Cl. 15—21)

ABSTRACT OF THE DISCLOSURE

In vehicle washing apparatus including a generally cylindrical brush which is rotated over the surface to be washed and which is moved towards that surface by an actuator fed by an hydraulic circuit, the maximum pressure of the circuit is controlled by an adjustable pressure relieving valve.

---

This invention is concerned with apparatus for washing surfaces of the kind which includes a generally cylindrical brush which is rotated over the surface to be washed. This type of apparatus is often used for washing vehicles such as trains where the apparatus is fixed and the vehicle is driven past the apparatus so that the brush engages the surface to be cleaned, however it is envisaged that such apparatus might be mounted upon a vehicle and that vehicle moved over the surface to be washed and that surface might be a surface of another vehicle or it might be a fixed surface such as the walls of an underpass or the like.

One such apparatus which we have proposed comprises a generally cylindrical brush which rotates about its axis and is pivotable about an axis spaced from its own axis to be moved between an operative advanced position in which it engages the surface to be cleaned and an inoperative, retracted position in which it does not so engage the surface.

In this apparatus we arranged for the brush to be moved between its operative position and inoperative position by hydraulically powered means and between the power means and the brush we located a resiliently yieldable link so that the brush could yield when engaged by a projection or a change of profile of the surface.

We now propose that the hydraulic circuit feeding the actuator should have its maximum pressure controlled by relief valve or blow-off valve of adjustable setting. Then when a projection or change of profile in the surface of the vehicle pushes the brush back from the advanced position, this can occur through yielding of the actuator itself, forcing the hydraulic fluid through the relief valve. Likewise, when the brush meets a portion of the surface that is set back from the remainder or a gap in the surface, the hydraulic pressure will move the brush further out to follow it. In other words, the brush will follow the contours of the surface regardless of its shape, subject only to the restriction provided by a stop which defines the outer limit to which the brush can move. The force with which the brush presses against the surface can be altered by adjusting the setting of the valve. The adjustment is made by rotation of an easily accessible control knob mounted on the casing of the equipment, the pressure being indicated on a pressure gauge; alternatively the knob itself could be calibrated in units of pressure.

An advantage over the resilient link employing only helical coil compression springs is that the yielding force is independent of the angular position of the brush-carrying arm and furthermore, of course, the yielding force of the spring type of link is not easily adjustable.

A retraction spring is provided so that in the event of failure of the electric supply to the pump, or a fault in the pump itself, the brush is not left in the forward position. This means that, in advancing the brush, the hydraulic system has to overcome the force of the spring but there is no difficulty in this. Instead of a spring we could use a counterweight, or could mount the whole brush assembly on helically inclined thrust faces, so that its own weight, acting downwards, produces a couple tending to turn the brush in the withdrawing direction.

The fact that the yielding force is substantially independent of the angular position of the brush is particularly valuable in the washing of the sides of vehicles which have a pronounced taper at one or both ends in plan view.

In a preferred arrangement the hydraulic equipment forms a self-contained unit built in behind the control panel of the apparatus; alternatively it could be mounted in a casing at the foot of the brush-supporting structure. The interruption of a sonic beam or a light beam by the entry of a vehicle into the washing area starts up an electric motor driving a hydraulic pump to feed fluid under pressure to the actuator, advancing the brush into the path of the vehicle. As high spots or projections or portions of the vehicle of increased width press against the brushes, fluid is forced out of the actuator cylinder through the relief valve and back to the fluid reservoir.

As set-back portions of the vehicle pass the brush additional fluid is fed by the pump to advance the brush further and maintain the even pressure.

To allow for the possibility of failure of the electricity supply to the pump, a by-pass is preferably incorporated, leading directly from the input side to the return side of the hydraulic actuator. This by-pass is normally closed by a solenoid valve connected in the same circuit as the motor, so that the by-pass is interrupted as long as the motor is running, but if the power fails or is switched off the valve opens, allowing the fluid to circulate freely between the two sides of the actuator, so that the brush can be withdrawn by the retraction spring.

At the end of the normal washing cycle, interruption of a further sonic beam or light beam switches off the motor and at the same time deenergizes the solenoid valve in the by-pass and allows the spring to withdraw the brush.

Instead of the starting and stopping signals, being produced by interruption of a sonic beam between a generator on one side of the path of the vehicle and a pick-up on the other side, they could be produced by completion of a beam (by reflection from the vehicle itself) between a generator and pick-up both situated on the same side. This simplifies the wiring and also it is less prone to giving spurious signals, for example caused by people walking past.

A preferred embodiment of this invention is illustrated in the accompanying drawings in which.

Figure 1:
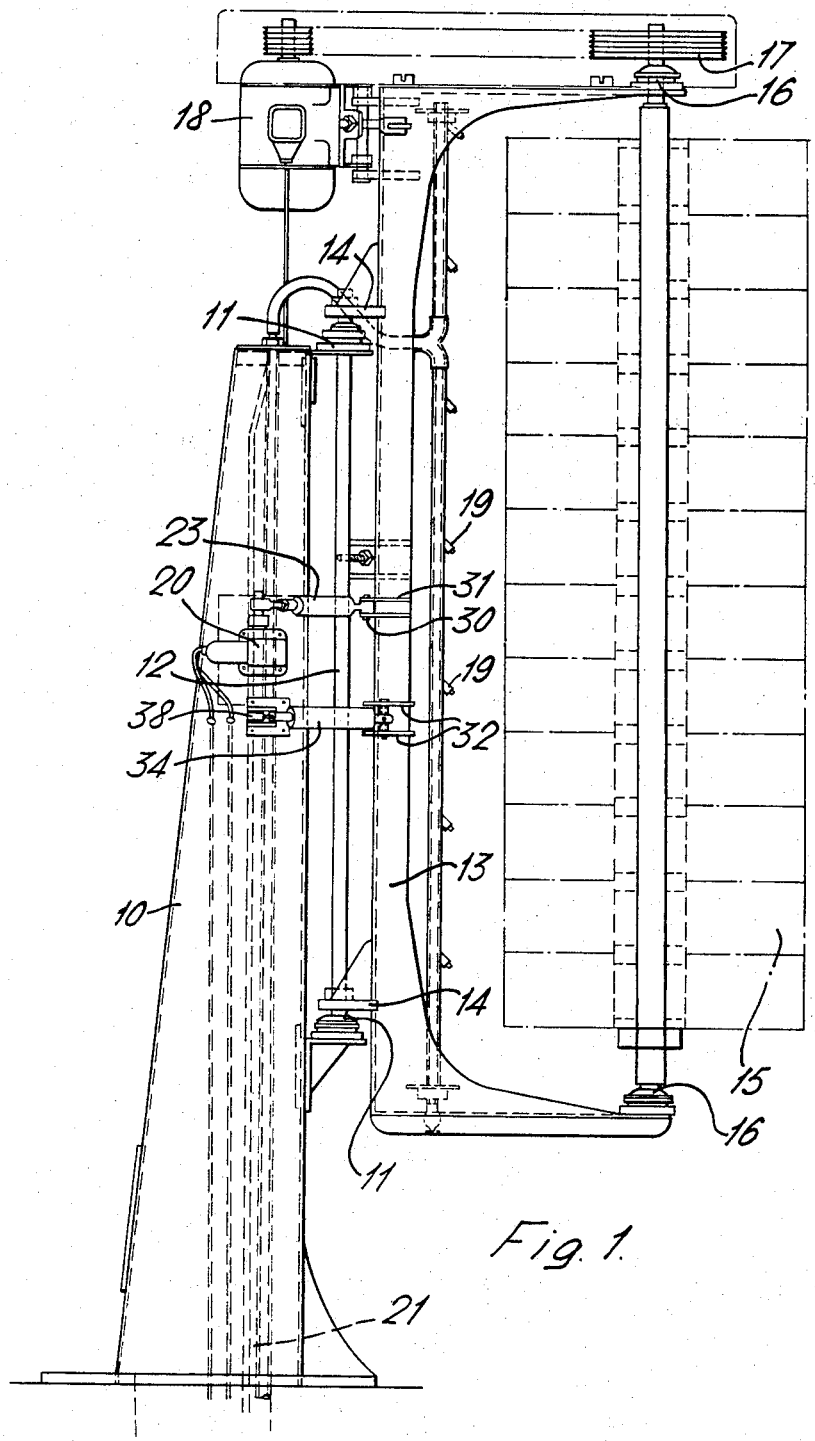
FIGURE 1 is an end view of a washing equipment for use in washing vehicles.
Figure 2:
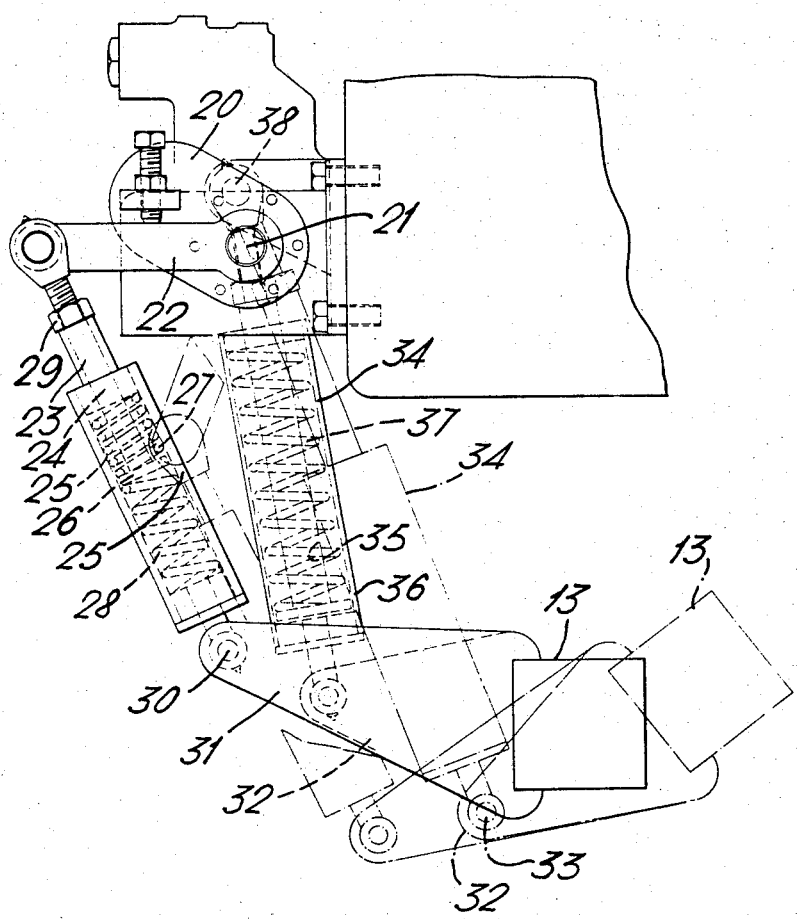
FIGURE 2 is a plan view of a detail of FIGURE 1.

A mounting column 10 carries a pair of bearings 11 in which the spindle 12 is supported and a U-shaped frame 13 is secured by brackets 14 for pivotal movement about the spindle between an advanced, operative position and a retracted, inoperative position. In FIGURE 2 the advanced position is shown in chain-dot line and the retracted position in full lines.

A generally cylindrical brush 15 is mounted in bearings 16 between the free ends of the limb of the frame and at its upper end is connected by a pulley drive 17 to a motor 18. Water or cleansing fluid sprays 19 are arranged to deliver the fluid to the brush.

An hydraulic actuator 20 is secured to the column 10 and carries on its output shaft 21 an arm 22 which is pivotally connected to lever 23 which forms a resilient link between the actuator and the brush for the purpose set forth hereinafter.

The lever 23 comprises a piston element 24 working in a cylinder 25 and having a head 26 to one side of which a spring 27 is located to act between the head and the adjacent end of the cylinder; and to the other side of the head a spring 28 which, in similar fashion to the spring 27, works between the head and its adjacent end of the cylinder.

The piston element is adjustable for length by the turn buckle arrangement 29.

The cylinder is pivotally connected by a pivot pin 30 between opposed ears of a bracket 31 which is carried by the upright bar of the U-shaped frame 13.

A second bracket 32 is mounted on the upright bar of the frame 13 at about the middle of that bar and between two opposed ears of that bracket a pivot pin 33 is secured and connects the bracket to a lever 34 which comprises a central piston member 35 and a cylinder 36 within which a spring 37 works to urge the brush to its retracted position. The end of the lever 34 remote from the frame 13 is pivotally secured on the column 10 as shown at 38.

Figure 3:
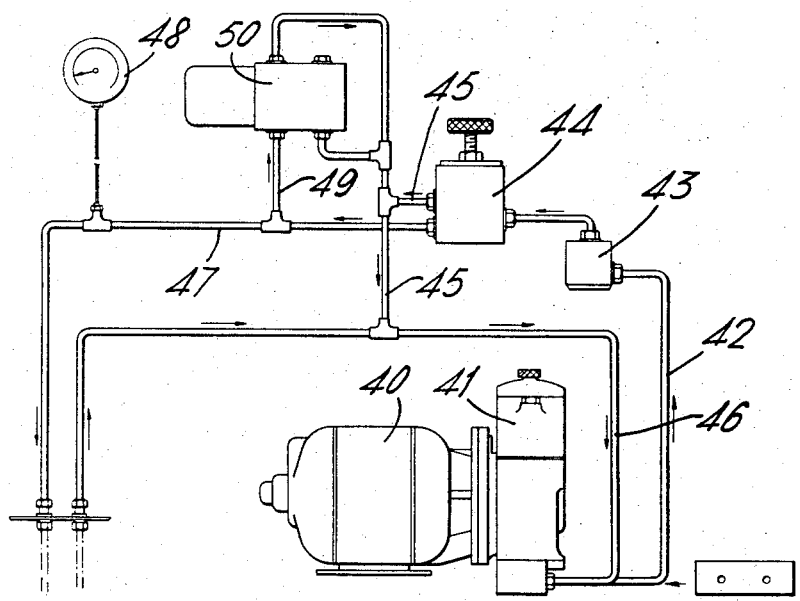
FIGURE 3 is a schematic illustration of the hydraulic circuitry associated with the brush control mechanism.

Referring now to FIGURE 3, a motor 40 drives an hydraulic pump 41 of which the delivery line 42 is connected, through a filter 43 to a variable pressure relief valve 44. The valve 44 has a relief line 45 through which excess delivery fluid is directed to the return line 46 of the circuit to the pump.

The output side of the valve 44 connects through line 47 to the brush actuator and that line includes a pressure gauge 48 which enables the pressure by which the brush is to be applied to the vehicle to be washed to be noted so that an appropriate pressure can be selected by adjustment of the valve 44.

The line 47 has a branch 49 leading to a solenoid valve 50 which is connected into the electrical circuit of the motor and is arranged to be closed whilst the solenoid is energized. The solenoid valve connects to the return line 46 so that should there be a power failure free movement of the fluid from the actuator is allowed. Thus a "fail safe" provision is made as the brush will be retracted by the springs 37 of the lever 34.

It will be appreciated that the existence of a pressure higher than the preset pressure in the supply line to the actuator will cause the valve 44 to be opened and the pressure relieved. Thus, the position of the brush is automatically adjusted to take acount of the variations in the contour of the vehicle.

We prefer to maintain the resilient link constituted by the lever 23 so that the initial impact of any large shocks, such as might occur during the cleaning of railway carriages if a carriage door is inadvertently left open, are taken by the springs of that lever rather than by the actuator however it will be understood that this is the only purpose of that lever because the disposition of the brush during washing is controlled by the actuator and the relief valve and that as the high pressure reaches the valve 44 that pressure will be relieved.

We claim:

1. Surface washing apparatus comprising a cylindrical brush, drive means operable to rotate said brush, a pivoted connection spaced from the axis of said brush about which the brush is pivoted between an operative advanced position and an inoperative retracted position, an hydraulic actuator operatively connected to said brush to move the brush between said operative and inoperative positions, an hydraulic circuit supplying hydraulic fluid to said actuator and including an adjustable pressure relieving valve, a line in said hydraulic circuit by-passing said actuator, and a valve to control the flow of hydraulic fluid in said by-pass line, said valve being movable between a normally closed position in which flow through the by-pass line is cut off, whereby hydraulic fluid is supplied through said hydraulic circuit to said actuator, and an open position in which the by-pass line is open whereby said actuator is short-circuited.

2. Apparatus as claimed in claim 1 in which said valve controlling said by-pass line is a solenoid valve so arranged that when the solenoid is energized the line is closed.

3. Apparatus as claimed in claim 1 in which said circuit includes a pump and an electric motor is drivingly connected to said pump and said solenoid is connected in the same circuit as said motor.

References Cited
UNITED STATES PATENTS

| | | | |
|---|---|---|---|
| 2,480,735 | 8/1949 | Holmes | 15—53 |
| 3,035,293 | 5/1962 | Larson. | |
| 3,134,117 | 5/1964 | Frank et al. | |
| 3,272,220 | 9/1966 | Frania et al. | 137—116.5 |

EDWARD L. ROBERTS, *Primary Examiner.*